United States Patent [19]

Acks et al.

[11] 3,944,967
[45] Mar. 16, 1976

[54] UPDATED DIVER NAVIGATION DEVICE

[75] Inventors: Robert S. Acks; Stanley J. Watson, both of San Diego; Howard B. McCracken, Poway, all of Calif.

[73] Assignee: The United States of America as represented by the Secretary of the Navy, Washington, D.C.

[22] Filed: Dec. 23, 1974

[21] Appl. No.: 535,542

[52] U.S. Cl. ................................ 340/6 R
[51] Int. Cl.² ............................... G01S 3/80
[58] Field of Search ................... 340/6 R, 16 R

[56] References Cited
UNITED STATES PATENTS
3,475,721   10/1969   Cappel, Jr. et al. ............... 340/6 R

*Primary Examiner*—Richard A. Farley
*Attorney, Agent, or Firm*—Richard S. Sciascia; Ervin F. Johnston; William T. Skeer

[57] ABSTRACT

In a diver's navigation system employing a receiver having three equal, angularly disposed hydrophone locations, a digital signal processing circuit is employed which receives frequency shift keyed digital data from remote beacons. Circuitry is provided to process this data to derive a bearing indication to the beacon.

4 Claims, 5 Drawing Figures

UPDATED DIVER NAVIGATION DEVICE

STATEMENT OF GOVERNMENT INTEREST

The invention described herein may be manufactured by or for the Government of the United States of America for navigational purposes without the payment of any royalties thereon or therefor.

FIELD OF THE INVENTION

This invention pertains to the field of underwater navigation. More particularly, this invention pertains to the field of portable navigation instruments used by swimmer-divers. In still greater particularity, this invention pertains to a diver navigation system employing frequency shift keyed digital beacons. By way of further characterization this invention pertains to a three hydrophone bearing receiver employing frequency shift keyed navigational information. By way of further characterization, this invention pertains to an underwater navigational system employing a frequency shift keyed acoustic beacon, together with a swimmer-diver carried beacon receiver.

DESCRIPTION OF THE PRIOR ART

Present diver navigation system for use with small, underwater beacons employs a noise-modulated, FM, acoustic signal as the navigational signal. Each beacon transmitting the navigational signal has an assigned frequency band on which it continually transmits.

The cooperating receiver assembly consists of three acoustic receiver channels, each of which receives information from one of three triangularly disposed hydropphones mounted in a plane on the receiver housing. Because the receiving hydrophones are positioned at the vertices of an equilateral triangle and the wave fronts are essentially plane wave signals, the receiver may process the time of arrival of the wave front at each hydrophone to obtain sine and cosine values of the bearing to the transmitter by conventional techniques. Of course, these trigometric functions may be, in turn, solved to obtain the bearing angle.

The use of linear FM as a modulation system requires an analog noise source for the modulating signal in the beacon which is band limited by the output of the noise-diode used in the generation of the noise signal and the frequency characteristics of the associated amplifier circuitry. The power consumption, physical size, and electronic complexity of the beacon assembly used in this system have made the beacons expensive, troublesome to maintain, to have relatively high power consumption, and to be of short operational life. It is the solution of these unresolved shortcomings of the prior art to which this invention addresses itself.

SUMMARY OF THE INVENTION

The invention provides a diver navigation system in which the marker beacon and receiver processing circuitry employs frequency shift keyed acoustic energy. The marker beacon circuit employs a timed power supply to each of the component circuits in order to prolong operational life. Further, the receiver circuitry employs a voltage and signal comparison system which materially reduces the erroneous bearing angle indications caused by bottom reverberation and other environmental phenomenea.

STATEMENT OF THE OBJECTS OF INVENTION

It is an object of this invention to provide an improved diver navigation system.

Another object of this invention is to provide an improved underwater navigational beacon.

Still another object of this invention is to provide an improved diver carried homing system.

Another object of this invention is the provision of frequency shift keyed navigational processing circuitry.

These and other objects of the invention will become more readily apparent from the ensuing specification when taken together with the drawings.

DESCRIPTION OF THE PREFERRED EMBODIMENTS

Figure 1:
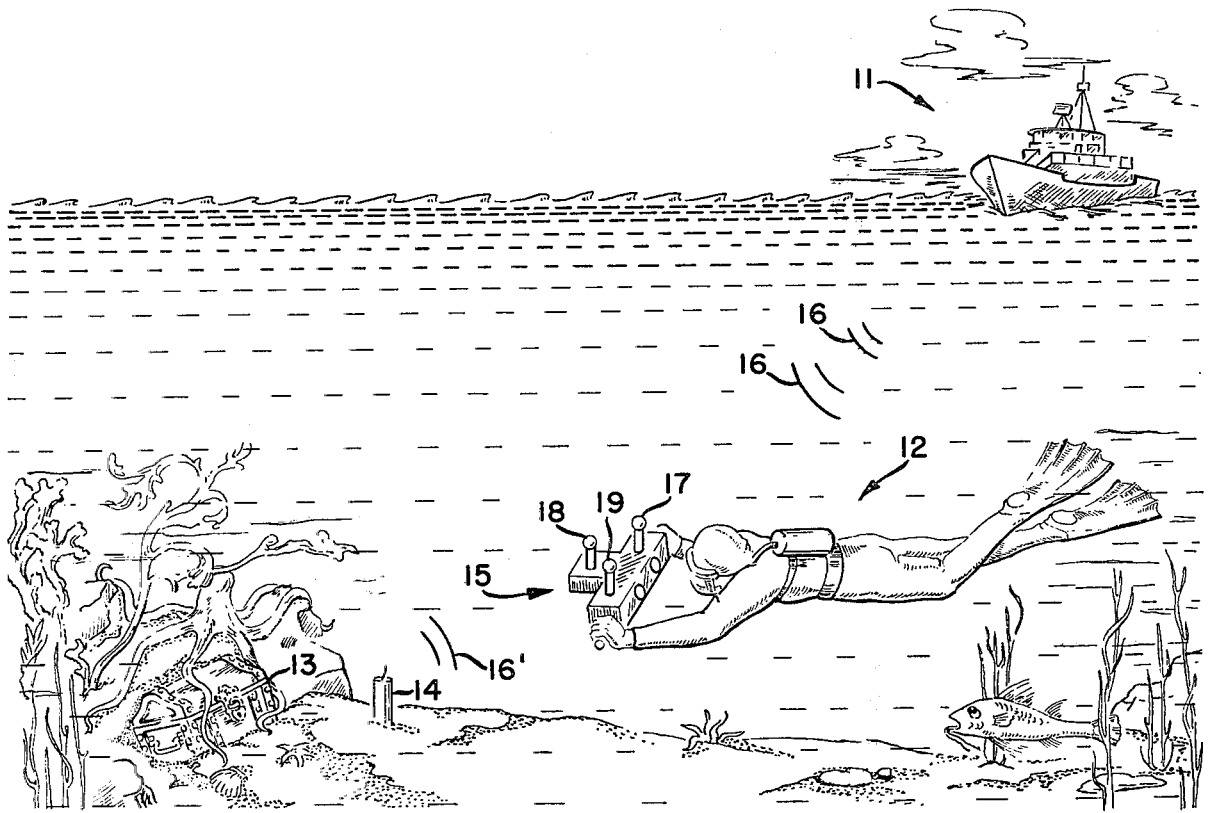
FIG. 1 is a perspective view showing the system of the invention in an operational environment.

Referring to FIG. 1, an oceanographic research vessel 11 provides a working station for a swimmer-diver 12 who is shown approaching an underwater object 13. Swimmer-diver 12 is guided in his approach to object 13 by means of an underwater beacon 14 situated nearby. Beacon 14 may have been placed in a proximity of underwater object 13 by a variety of means such as, for example, ejection from oceanographic vessel 11 to mark a previously received sonar contact. Diver 12 navigates between oceanographic vessel 11 and underwater object 13 by means of a diver navigation instrument, indicated generally at 15, which responds to sonic pulsed energy emanating from oceanographic vessel 11 or beacon 14. These energy pulses, indicated at 16 and 60' respectively, are propagated through the water and impinge a triad of hydrophones indicated at 17, 18, and 19 respectively. The parameters of this system, thus far described, are conventional in the diver and oceanographic instrumentation arts.

In the past, navigational beacon systems for divers have employed noise modulated FM signal sources which transmit continuously over their assigned portion of the acoustic spectrum and are selected by frequency discriminating circuits within diver navigation receiver 15.

Such systems while being satisfactory for their intended purpose and range of utilization suffer from a low battery life, in case of remote beacons 14, and ease of detection by unauthorized or undesirable monitoring stations. In these prior art systems the use of linear FM as a modulation scheme requires an analog noise source for modulating this signal to be transmitted by the beacon and requires detection and filtering circuitry in the receiver. The analog noise for the modulating signal is provided by band limiting the output of a noise diode and associated amplifier circuitry. The band limiting is conventionally accomplished by means of low pass filters. Additionally, circuitry is required for the frequency modulation of a carrier signal.

As may be readily seen the consumption and circuitry size and complexion of the beacon assembly as a result of the choice of FM is unnecessarily excessive for remote instrumentation. Likewise, the complexity of the detection and filtering circuitry in the receiver causes power consumption problems.

A fixed package size for the use of beacon 14 is determined by beacon handling equipment aboard vessel 11. Thus, an improvement in beacon life may be obtained if a portion of the beacon housing previously required for circuitry is given over to the storage of a battery power supply. It is in this fashion that the invention provides an improved navigation system for use of swimmer-divers without redesign of beacon handling and storage equipment or basic detection circuitry redesign of the swimmer-diver carried reception equipment.

Figure 2:
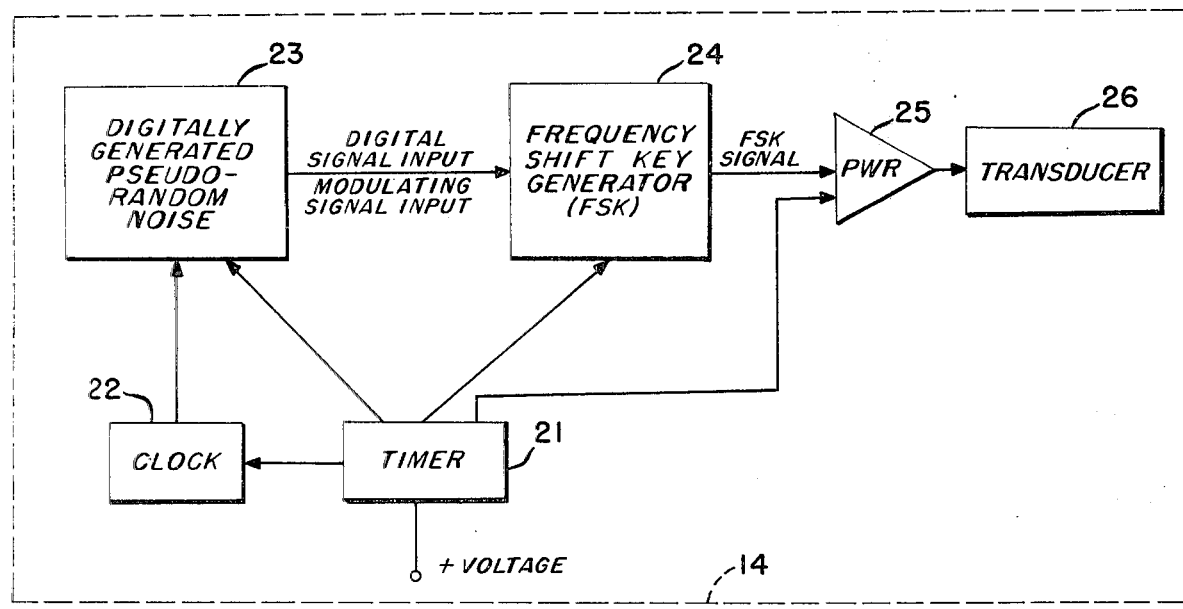
FIG. 2 is a diagrammatic representation of the navigational beacon in the system of the invention.

Referring to FIG. 2, a diagrammatic representation of the beacon transmitter is illustrated. As shown, a timer 21 receives from the enlarged conventional battery package the electrical energy for operation of the transmitter and supplies all active elements in the transmitter beacon. In this fashion, no power is consumed during shut down periods, except for the operation of timer 21 itself. Of course, timer 21 may be, if desired, a mechanical or spring driven instrument.

However, in the preferred embodiment timer 21 is a conventional electrically operated timing circuit which keys the beacon 14 with a low duty cycle such that bursts of frequency shift keyed energy are transmitted at predetermined intervals rather than a continuous transmission as in the case with the aforedescribed prior art beacon systems.

A clock circuit 22 keys a digitally generated pseudo random noise generator 23 to produce a pseudo random noise burst which is used as a modulating signal as will be presently described. Digitally generated pseudo random noise circuit 23 may be of any conventional type of digital signal generating circuit which produces a pseudo random digital output. Many such circuits have been designed for telemetry purposes for use in conjunction with space exploration and may be incorporated with equal advantage in the system of the invention. That shown in U.S. Pat. No. 3,305,636 granted to James E. Webb for "Phase Shift Data Transmission System Having a Pseudo-Noise Sync Code Modulated with the Data in a Single Channel" is illustrative of such a circuit.

As previously noted, the output of digitally generated pseudo random noise circuit 23 is used as a digital signal input to modulate or key a frequency shift key generator 24. Such frequency shift keyed oscillators are well known in the art and a representative sample of may be incorporated in a system of the invention if desired. For example, such circuits as used in FSK teletype equipment where two crystal-controlled oscillators are selectively gated may be employed here with good effect.

The frequency shift keyed output from frequency shift key generator 24 is fed by suitable circuit connections to a power amplifier 25 which, in turn, is connected to an acoustic transducer 26. Power amplifier 25 and transducer 26 may be of a type which is conventional in oceanographic instrument constructions known in the art. In such devices a cylindrical electroacoustic transducer surrounds and provides an outer casing for internally-contained battery and electronic packages. Such a construction is shown, for example, by E. A. Granfors et al. in U.S. Pat. No. 3,444,508 granted on May 13, 1969 for "Directional sonar System".

Thus, it may be seen that by employing conventional circuitry and packaging techniques, an improved underwater marker beacon is provided which transmits timed bursts of frequency shift keyed acoustic energy to be used as a digital signal source in the diver navigation system of the invention. Each burst, of course, contains sufficient redundancy to permit determining the bearing angle.

It is well understood in the electronic navigation arts, the triangular spacing configuration of the receiving hydrophones 17, 18, and 19 in conjunction with the essentially plain wave front signal beacons transmitted either from beacon 14 or surface vessel 11 may be conveniently processed to indicate a sine and cosine relation between the hydrophone array and the signal source. Such an arrangement and the trigonometric consideration thereof are discussed in U.S. Pat. No. 3,383,651 granted on May 14, 1968 to S. N. Koblick for "Plane Coordinate Computing System" and are incorporated herein. Although the inventors make no claim of originality of this arrangement and since it is well understood in the art, a detailed explanation thereof is deemed unwarranted. However, it should be noted that each of the three hydrophones receives the idential plane wave signal and the electrical output therefrom differs only in time of arrival of the beacon signal. By appropriate gating, a sine and cosine function may be obtained.

Figure 3:
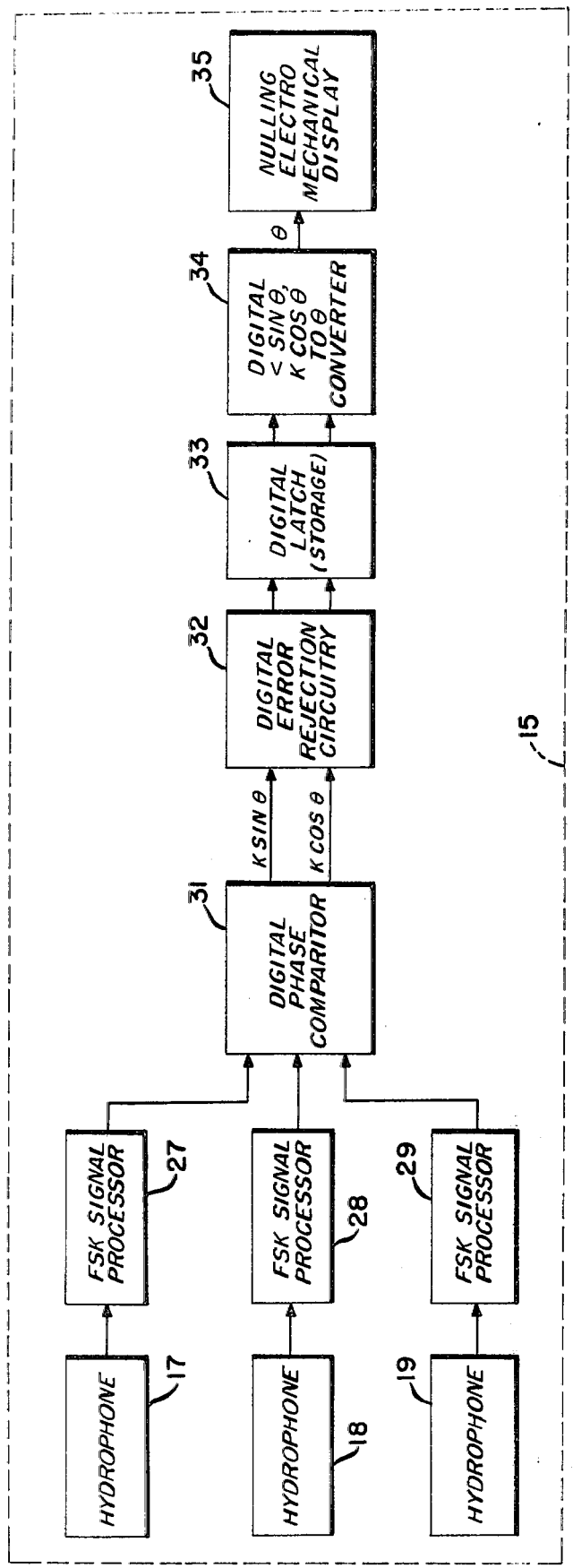
FIG. 3 is a diagrammatic representation of the diver carried beacon receiver illustrated in FIG. 1.

Referring to FIG. 3, a diagrammatic representation of the major circuit elements comprising the swimmer diver carried navigation receiver 15 are illustrated. As shown, hydrophone 17 is connected to a FSK signal processor 27 which, as the name would imply, receives and processes the electrical analog of the plane wave front navigational signal impinging the individual hydrophones. The nature of FSK signal processor 27 will be more completely explained herein. However, it should be noted that the output therefrom corresponds to the modulation envelope transmitted by the individual beacon sources. Similarly, hydrophone 18 is connected to FSK signal processor 28 and hydrophone 19 is connected to FSK signal processor 29.

FSK signal processors 27, 28, and 29 are connected to a digital phase comparison circuit 31 which is a conventional coincidence gating circuit of the type previously referred to to determine signals proportional to the sine and cosine of the bearing angle between navigation receiver 15 and the beacon source.

The output of digital phase comparator 31 is connected to a suitable digital error rejection circuitry 32. Digital error rejection circuitry 32 samples the output from digital phase comparator 31 and determines by a sampling technique which of the various inputs thereto most likely corresponds to the true sine and cosine information and rejects spurious signals which may be due to bottom reverberation or multipath reflections.

The output of digital error rejection circuitry 32 is connected to a digital latch circuit 33 which may be considered a digital buffer storage register where the information is held until the next burst of energy is received. Such latch ciruits are conventional in the digital processing arts and need not be further described for a complete understanding of this invention.

The stored digital information in digital latch storage 33 is transferred to a digital $K\sin\theta$, $K\cos\theta$ to $\theta$ convertor where it is transformed to an electrical analog of the bearing angle θ. This information is in turn connected to a nulling electromechanical display 35 which displays the bearing information such that diver 12 may correct his course and navigate between vessel 11 and underwater object 13. A further reduction in consumed power is effected by the use of a electromechanical meter movement for nulling electromechanical display 35 which mechanically secures the instrument pointer to its last position such that the instrument draws no power except when the position of the indicator is being changed.

If desired, digital converter 34 and nulling electromechanical display 35 may be replaced with the instrumentation system disclosed in co-pending application filed by Alfred M. Medrano and identified as Ser. No. 510,347 filed in the U.S. Patent Office on Sept. 30, 1974.

Figure 4:
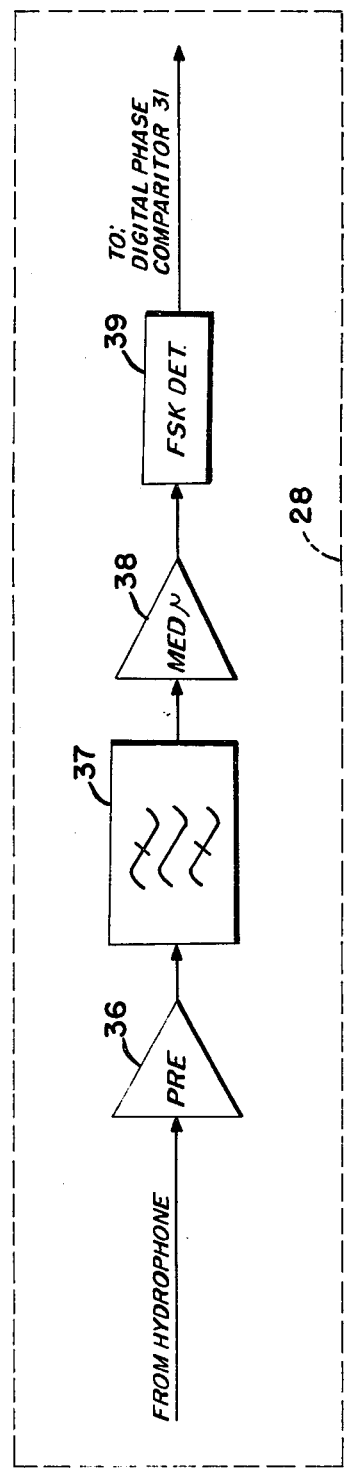
FIG. 4 is a diagrammatic representation of the FSK signal processor circuit of FIG. 3.

Referring to FIG. 4, the details of FSK signal processor circuits 27, 28, and 29 will be described. For purposes of levidity, only a single FSK signal processor 28 will be described. It should be understood that FSK signal processor 27 and 29 are identical. Signals from the associated hydrophone are amplified by a suitable solid state preamplifier 36. This amplifier is constructed such as to be a low noise voltage amplifier and serves to strengthen the hydrophone signal for subsequent signal processing. A bandpass filter 37 removes signals beyond the known frequency range of transmitting beacon and thus improves signal to noise ratio in the processed signal by illiminating or greatly reducing spurious signal sources as might be occasioned by biological noises or other water born acoustic energy. The filtered output from bandpass filter 37 is amplified by a medium gain amplifier 38 and thence connected to an FSK detector 39. The output of FSK detector 39 is connected to digital phase comparator 31 as previously described.

Figure 5:
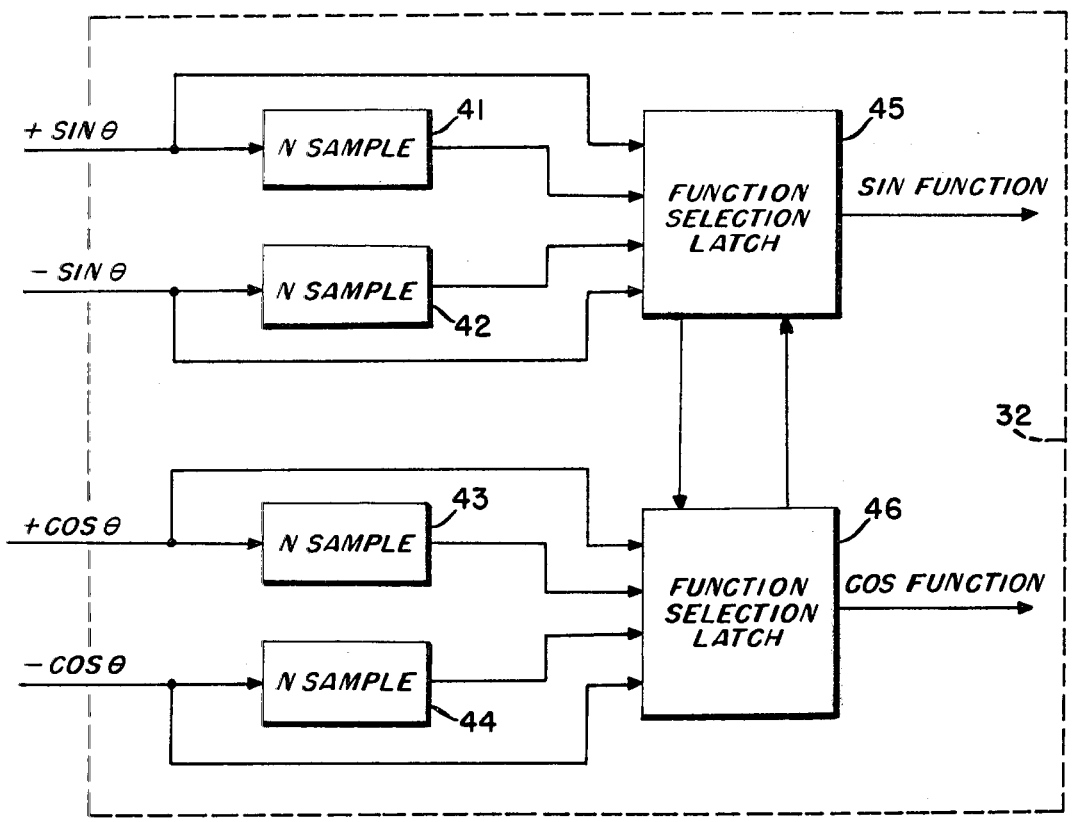
FIG. 5 is a diagrammatic representation of the digital error rejection circuitry shown in FIG. 3.

Referring to FIG. 5, the circuitry details of digital error rejection circuitry 32 will be described. As illustrated, the inputs are coupled through voltage responsive gates to separate positive and negative signals and are coupled to a plurality of sampling circuits indicated at 41 and 42 so as to sample the sine inputs and at 43 and 44 to sample the cosine inputs.

A suitable number of clock signals corresponding to transmitted frequency shift signals are sampled until one of the sample circuits 41, 42, 43 or 44 has obtained a predetermined value which indicates the likelihood that the information corresponding to the input of that sample circuit is the probable correct signal and that signals in the other sample circuits correspond to spurious noises. When this level has been reached a function selection latch circuit 45 locks out the undesired input and connects the input to the corresponding sample cell as an output to the digital latch storage circuit 33.

Similarly, the cosine signals are handled in an identical fashion. It should be noted that function selection latch circuits 45 and 46 may be synchronized or otherwise suitably interconnected such that the corresponding inverse function is selected at the time sample circuits 41-44 indicates the probability of a true signal. That is, as will be well understood, except for bearing angles corresponding to 45° the sine and cosine sampling circuits will fill at a different rate and a true indication requires that the associated cofunction be selected simultaneously. In this fashion, digital error rejection circuitry 32 assures that the digital latch storage will include a digital count more representative of the transmitted beacon signal than would otherwise be possible and correspondingly, be more free from contamination by spurious signals such as caused by bottom reverberation and the like.

MODE OF OPERATION

The operation of the system of the invention is essentially the operation of the individual components previously described. That is, a marker beacon 14 is placed adjacent an underwater object 13 to which future access is desired. Diver 12 enters the water at a remote point, as for example, from oceanographic vessel 11. When in the water, he turns on navigation receiver 15 and selects a receiver frequency channel corresponding to the center channel allocation of beacon receiver 14. The bearing indication on receiver 15 will point to a bearing angle corresponding to the heading to underwater object 13. Keeping receiver 15 before him, diver 12 swims toward underwater object 13 at the approximate bearing angle indicated by the receiver. At the next clocked transmission from beacon 14 occasioned by the energization of the timer 21, an additional burst of FSK navigation pulses is transmitted throughout the water. From impinging hydrophones 17, 18, and 19, the display on receiver 15 is updated to correspond to the new bearing angle. If the diver 12 is swimming directly toward underwater object 13, this corrected bearing angle will indicate 0. If not, a small bearing angle θ will be indicated showing diver 12 he is headed either to the left or the right of underwater object 13. By making corrections, diver 12 approaches underwater object 13 until visual contact is obtained.

When diver 12 desires to return to his surface station or support vessel 11, he selects a frequency allocation corresponding to the navigation beacon located thereon and repeats the swimming and successive angle approximation until he has approached and established visual contact with vessel 11. Of course, oceanographic vessel 11 may have moved fron its initial position when diver 12 entered the water and thus, the system of the invention may be employed in highly mobile operations.

The foregoing description taken together with the appended claims constitute a disclosure such as to enable a person skilled in the electronics and oceanographic arts and having the benefit of the teachings contained therein to make and use the invention. Further, the structure herein described meets the objects of invention, and generally constitutes a meritorious advantage in the art unobvious to such a person not having the benefit of these teachings.

Obviously many modifications and variations of the present invnetion are possible in the light of the above teachings, and, it is therefore understood that within the scope of the disclosed inventive concept, the invention may be practiced otherwise than specifically described.

What is claimed is:

1. An underwater navigation system comprising:
    a beacon transmitter structured for transmitting a series of frequency shift, FSK, keyed transmissions and including;
    a source of electrical power, and
    timer means connected between said source of electrical power of said beacon transmitter and the individual circuits thereof for energizing said circuits at predetermined intervals to produce a low, power-conserving duty cycle; and
a beason receiver configured for location at a station remote from said beacon transmitter for receiving the signals from said beacon transmitter and display of a bearing angle therebetween and including,
three spaced hydrophones located at points spaced as the verticies of an equilateral triangle,
a plurality of FSK signal processing means each of which is operatively connected to one of said hydrophones to be associated therewith for processing the electrical outputs therefrom to obtain an amplified and detected output signal corresponding to the signal transmitted by the aforesaid beacon transmitter,
digital phase comparator means connected to said FSK signal processing means for timely comparison of the output signals therefrom to obtain a signal corresponding to the sine and cosine of the bearing angle to be displayed,
digital error rejection circuitry operatively connected to said digital phase comparator means so as to receive the sine and cosine signals therefrom and sample said signals to distinguish real from spurious signals,
digital latch circuit means operatively connected to said digital error rejection circuitry for storing the distinguished real signals until updated by a subsequent reception of transmitted beacon information, and
display means operatively connected to said digital latch circuit means for converting said real signals to a visual signal indicating the bearing angle between the beacon receiver and the beacon signal source.

2. An underwater navigation system according to claim 1 in which each FSK signal processing means includes:
preamplifier means operatively connected to the associated hydrophone for voltage amplification of the output signals therefrom;
bandpass filter means operatively connected to said preamplifier means for limiting the frequencies of the voltage amplified output therefrom to a predetermined range of values;
amplifier means connected to said bandpass filter means for amplifying the output signals within said predetermined range of frequency values; and
FSK detection means to detect the frequency shift keyed modulation envelope therefrom.

3. An underwater navigation system according to claim 1 in which said digital error rejection circuitry includes:
a first pair of sample circuits each operatively connected to said digital phase comparator means to receive a single sign value of the sine function output thereof;
a first function selection latch circuit operatively connected to said first pair of sample circuits and to their inputs to select and hold the particular sign value of the sine output from said digital phase comparator corresponding to the sample circuit of said first pair which first reaches a predetermined sample level;
a second pair of sample circuits each operatively connected to said digital phase comparator means to receive a single sign value of the cosine function output thereof; and
a second function selection latch circuit operatively connected to said second pair of sample circuits and to their inputs to select and hold the particular sign value of the cosine output from said digital phase comparator corresponding to the sample circuit of said second pair which first reaches a predetermined sample level.

4. An underwater navigation system according to claim 2 in which said digital error rejection circuitry includes:
a first pair of sample circuits each operatively connected to said digital phase comparator means to receive a single sign value of the sine function output thereof;
a first function selection latch circuit operatively connected to said first pair of sample circuits and to their inputs to select and hold the particular sign value of the sine output from digital phase comparator corresponding to the sample circuit of said first pair which first reaches a predetermined sample level;
a second pair of sample circuits each operatively connected to said digital phase comparator means to receive a single sign value of the cosine function output thereof; and
a second function selection latch circuit operatively connected to said second pair of sample circuits and to their inputs to select and hold the particular sign value of the cosine output from said digital phase comparator corresponding to the sample circuit of said second pair which first reaches a predetermined sample level.

* * * * *